US009187919B2

(12) United States Patent
Grasa

(10) Patent No.: US 9,187,919 B2
(45) Date of Patent: Nov. 17, 2015

(54) APPARATUS FOR MECHANICALLY TREATING A LIQUID COMPOSITION AND METHOD FOR MECHANICALLY TREATING SUCH A LIQUID COMPOSITION

(76) Inventor: Jean-Pierre Grasa, Toulouse (FR)

(*) Notice: Subject to any disclaimer, the term of this patent is extended or adjusted under 35 U.S.C. 154(b) by 161 days.

(21) Appl. No.: 14/001,263

(22) PCT Filed: Feb. 24, 2012

(86) PCT No.: PCT/EP2012/053206
§ 371 (c)(1),
(2), (4) Date: Aug. 23, 2013

(87) PCT Pub. No.: WO2012/113931
PCT Pub. Date: Aug. 30, 2012

(65) Prior Publication Data
US 2013/0327721 A1    Dec. 12, 2013

Related U.S. Application Data

(60) Provisional application No. 61/468,205, filed on Mar. 28, 2011.

(30) Foreign Application Priority Data

Feb. 25, 2011 (FR) ...................... 11 00569

(51) Int. Cl.
| | | |
|---|---|---|
| *B01F 3/04* | (2006.01) | |
| *E04H 4/12* | (2006.01) | |
| *B01F 7/22* | (2006.01) | |
| *B01F 15/00* | (2006.01) | |
| *C02F 3/16* | (2006.01) | |

(52) U.S. Cl.
CPC ............ *E04H 4/1209* (2013.01); *B01F 3/0478* (2013.01); *B01F 3/04531* (2013.01); *B01F 3/04609* (2013.01); *B01F 3/04737* (2013.01); *B01F 3/04773* (2013.01); *B01F 7/22* (2013.01); *B01F 2003/04872* (2013.01); *B01F 2015/00642* (2013.01); *B01F 2215/0052* (2013.01); *C02F 3/16* (2013.01); *Y02W 10/15* (2015.05)

(58) Field of Classification Search
CPC ...... B01F 3/04; B01F 3/0473; B01F 3/04531; B01F 3/04737; B01F 3/04773; C02F 3/14
USPC ............. 261/83, 84, 91, 119.1; 210/219, 220, 210/221.1
See application file for complete search history.

(56) References Cited

U.S. PATENT DOCUMENTS

| | | | |
|---|---|---|---|
| 5,021,154 A | 6/1991 | Haegeman | |
| 6,585,236 B2 * | 7/2003 | Tanabe et al. | ................... 261/91 |

FOREIGN PATENT DOCUMENTS

| | | |
|---|---|---|
| EP | 0 366 644 A1 | 5/1990 |
| FR | 2 609 459 A1 | 7/1988 |
| JP | 2003 236579 A | 8/2003 |

OTHER PUBLICATIONS

International Search Report, dated May 2, 2012, from corresponding PCT application.

*Primary Examiner* — Robert A Hopkins
(74) *Attorney, Agent, or Firm* — Young & Thompson

(57) ABSTRACT

Disclosed is an apparatus for mechanically treating a liquid composition contained in a pool, including: —a frame which supports a motor (2) out of the liquid composition, —a drive shaft (6) which is rotatably driven by the motor, —a centrifugal surface aerator (4) which is rotatably driven by the drive shaft in a first rotation direction, —a bottom mixer (8), which is rotatably driven by the drive shaft, in which the motor (2) can be driven in a second rotation direction, counter to the first rotation direction. The apparatus includes a device for activation/deactivation of the aerator, which device is capable of deactivating the aerator (4) in the second rotation direction of the drive shaft (6), so that the aerator is not to rotatably driven by the drive shaft (6), the aerator being inoperative on the liquid composition.

20 Claims, 3 Drawing Sheets

Figure 1:
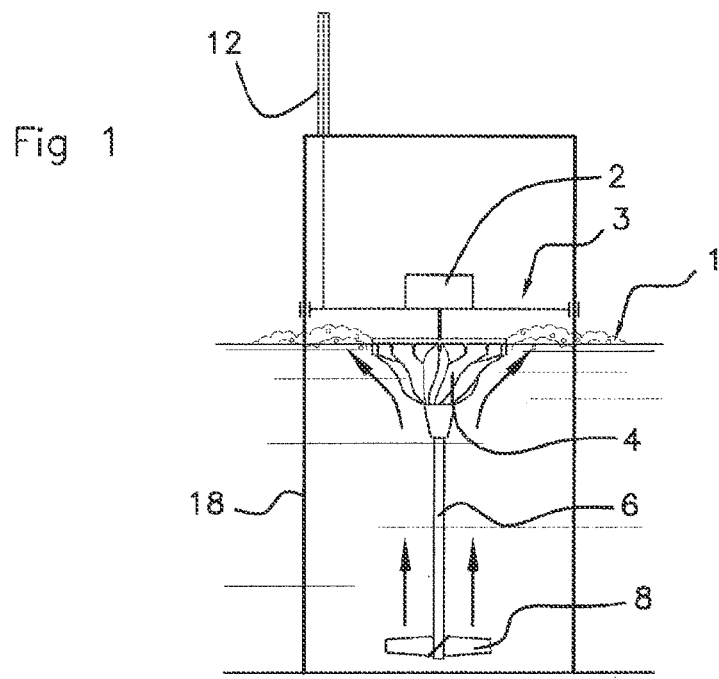

APPARATUS FOR MECHANICALLY TREATING A LIQUID COMPOSITION AND METHOD FOR MECHANICALLY TREATING SUCH A LIQUID COMPOSITION

The invention relates to an apparatus for mechanically treating a liquid composition which is contained in a pool, in particular waste water which is treated in purification stations.

The invention also relates to a method for mechanically treating such a liquid composition.

There is already known from FR 2609459 an apparatus which comprises an aerator and a mixer which are rotatably driven by the same drive shaft, the aerator being arranged at the surface of the liquid and the mixer being arranged at a lower level, in the liquid. Such an apparatus is intended to be used during periods of aerobic biological treatment. It allows not only the liquid close to the surface to be aerated but also the liquid at the bottom of the pool, owing to the mixer which is arranged below the aerator.

However, an apparatus according to FR 2609459 cannot be used during periods of anaerobic treatment, that is to say, during which only mixing of the liquid must be carried out, without aeration.

An object of the invention is therefore to provide an apparatus for mechanically treating a liquid composition which, in addition to allowing effective aeration and mixing treatment operations of a liquid composition to be carried out, allows effective mixing treatment of a liquid composition to be carried out without aeration.

An object of the invention is in particular to provide an apparatus for mechanically treating a liquid composition which allows effective mixing of the entire volume of liquid composition to be treated contained in a pool, without aeration, that is to say, a treatment operation of the anaerobic type.

An object of the invention is also to provide an apparatus for mechanically treating a liquid composition whose production, installation and implementation is compatible with the constraints of industrial use, in particular in terms of cost.

To this end, the invention relates to an apparatus for mechanically treating a liquid composition contained in a pool, comprising:
- a frame which supports a motor out of the liquid composition,
- a drive shaft which is rotatably driven by the motor and which is immersed in the liquid composition,
- a centrifugal surface aerator which is rotatably driven by the drive shaft in a first rotation direction of the drive shaft and which is capable of having maximum efficiency for driving the liquid composition in the first rotation direction of the drive shaft,
- a bottom mixer, which is rotatably driven by the drive shaft, in which:
- the motor can be driven in a second rotation direction, counter to the first rotation direction,
- the apparatus comprises a motor control unit which is capable of being able to control the driving of the drive shaft in the second rotation direction, characterised in that the apparatus comprises a device for activation/deactivation of the aerator, which device is capable of deactivating the aerator in the second rotation direction of the drive shaft, so that the aerator is not to rotatably driven by the drive shaft, the aerator being inoperative on the liquid composition in the second rotation direction.

In a first rotation direction of the drive shaft, such an apparatus therefore allows an aeration and a mixing operation to be carried out for a liquid composition to be treated, the centrifugal surface aerator and the bottom mixer both acting on the liquid composition, but, in a second rotation direction of the drive shaft, also allows effective mixing of a liquid composition to be treated to be carried out without aeration, the centrifugal surface aerator being deactivated. In this manner, the same mechanical treatment apparatus, alternately and in accordance with requirements, allows a biological treatment step of the aerobic type and a biological treatment step of the anaerobic type to be carried out without requiring a device for lifting and/or lowering the apparatus. In this manner, the position of the apparatus, that is to say, its level of immersion in the liquid composition, may remain unchanged in the first and in the second rotation direction.

In this manner, in an apparatus according to the invention, in the second rotation direction, the aerator is deactivated so as not to be rotatably driven by the drive shaft and therefore without requiring a movement of the aerator relative to the level of the liquid composition. The activation/deactivation device of the aerator may comprise any device which allows the aerator to be rotatably driven by the drive shaft in the first rotation direction and allows the aerator to be disengaged in terms of rotatable driving by the drive shaft in the second rotation direction. In particular, advantageously and according to the invention, a unidirectional rotary transmission device, referred to as a free wheel, is arranged between the drive shaft and the aerator. The free wheel allows the aerator to be rotatably driven by the drive shaft only in the first rotation direction of the drive shaft. In this manner, the position of the aerator relative to the level of the surface of the liquid composition remains the same in the first and in the second rotation direction of the drive shaft.

Advantageously and according to the invention, an apparatus according to the invention comprises a unidirectional rotary transmission device, referred to as a free wheel, that allows the aerator to be rotatably driven by the drive shaft in the first rotation direction, and disengages the drive shaft and the aerator in the second rotation direction of the drive shaft, for which the aerator is not rotatably driven by the drive shaft.

In this manner, advantageously and according to the invention, the position of the aerator relative to the level of the liquid composition (that is to say, relative to the surface of the liquid composition) is identical in the first rotation direction and in the second rotation direction.

Furthermore, advantageously and according to the invention, the aerator is generally in the form of a cone to which there are fixed blades which extend in an oblique manner from the tip to the base of the cone. Such an aerator has maximum aeration efficiency in one specific rotation direction and is therefore intended to be used as an aerator only in this specific rotation direction, that is to say, in which it allows the liquid composition to be projected towards the outer side in order to maximise the contact of the liquid composition with the air.

On the other hand, advantageously and according to the invention, the mixer is formed by an axial propeller. Such an axial propeller may have any shape and comprise a number of blade(s) which is capable of causing a movement of the liquid composition which allows effective mixing. Such an axial propeller may comprise, for example, from two to ten blades, for example, four blades. In particular, such an axial propeller may, for example, have the same properties for moving the liquid composition in the two possible rotation directions in order to allow the same efficiency of mixing in the event of aerobic or anaerobic type treatment.

Advantageously and according to the invention, an apparatus according to the invention further comprises a guide conduit which is formed by a cylindrical portion formed by means of revolution and which is arranged between the mixer and the aerator so that the axis of the drive shaft is aligned with the rotation axis of the cylindrical portion. Such a guide conduit allows the efficiency of an apparatus according to the invention to be improved by channelling an ascending flow of liquid composition formed during an aeration and mixing step in the same manner as during a mixing step without aeration, by channelling a descending flow of liquid composition. Such a guide conduit may have any shape which is capable of improving the efficiency of the mechanical treatment operation of the liquid composition. In particular such a guide conduit may, for example, have a cylindrical shape formed by means of revolution and widened at the ends thereof.

Advantageously and according to the invention, the drive shaft is arranged vertically in the pool. In this manner, advantageously and according to the invention, the rotation axis of the aerator and the rotation axis of the mixer are parallel with the drive shaft.

Advantageously and according to the invention, an apparatus according to the invention comprises a frame which allows the motor to be kept out of the liquid composition and allows the drive shaft which is immersed in the liquid composition to be supported. Advantageously and according to the invention, the frame comprises pillars which rest on the base of the pool. The frame may, for example, comprise a platform on which the motor rests. The frame may also comprise a platform which does not rest on the base of the pool but instead on the upper edges of the pool, out of the liquid composition. It may, for example, be a base which is fixed to the edges of the pool.

The invention also relates to a method for mechanically treating a liquid composition contained in a pool, in which:
  a motor is supported out of the liquid composition by a frame,
  a drive shaft is rotatably driven by the motor and is immersed in the liquid composition,
  a centrifugal surface aerator is rotatably driven by the drive shaft in a first rotation direction, the aerator being capable of having maximum efficiency for driving the liquid composition in the first rotation direction of the drive shaft,
  a bottom mixer is rotatably driven by the drive shaft,
  the driving of the drive shaft in a second rotation direction, counter to the first rotation direction, is controlled via a control unit of the motor, characterised in that, in the second rotation direction, the aerator is deactivated by an activation/deactivation device of the aerator so that it is not to rotatably driven by the drive shaft, in order to render it inoperative on the liquid composition in the second rotation direction.

A method for mechanically treating a liquid composition according to the invention therefore alternately allows, on the one hand, an aeration and a mixing operation of a liquid composition to be treated to be carried out, the centrifugal surface aerator and the bottom mixer both being driven in a first rotation direction and, on the other hand, a mixing operation without aeration of a liquid composition to be treated to be carried out, the bottom mixer being driven in a second rotation direction of the drive shaft and the surface centrifugal aerator being deactivated so as not to be driven in rotation by the drive shaft. In this manner, it is not necessary to modify the level of immersion of the aerator or the entire apparatus in order to move from a biological treatment step of the aerobic type to a biological treatment step of the anaerobic type, and vice versa, the position of the aerator relative to the level of the liquid composition remaining identical in the first and in the second rotation direction.

Advantageously and according to the invention, in the first rotation direction, the aerator and the mixer are rotatably driven by the shaft and allow the formation of an ascending flow of liquid composition from the mixer towards the aerator. In the first rotation direction, the mixer brings about the formation of an ascending flow of the liquid composition, starting from the base of the pool and being directed towards the surface of the liquid composition, in the region of the aerator which projects a flow of liquid composition out of the liquid composition.

Advantageously and according to the invention, in the second rotation direction, the aerator is rendered inoperative and the mixer is rotatably driven by the drive shaft, the mixer allowing the formation of a descending flow of liquid composition from the surface of the liquid towards the mixer. In the second rotation direction, the mixer brings about the formation of a descending flow of the liquid composition, extending from the surface of the liquid towards the base of the pool.

The invention also relates to an apparatus and a method, characterised in combination by all or some of the features mentioned above or below.

Figure 2:
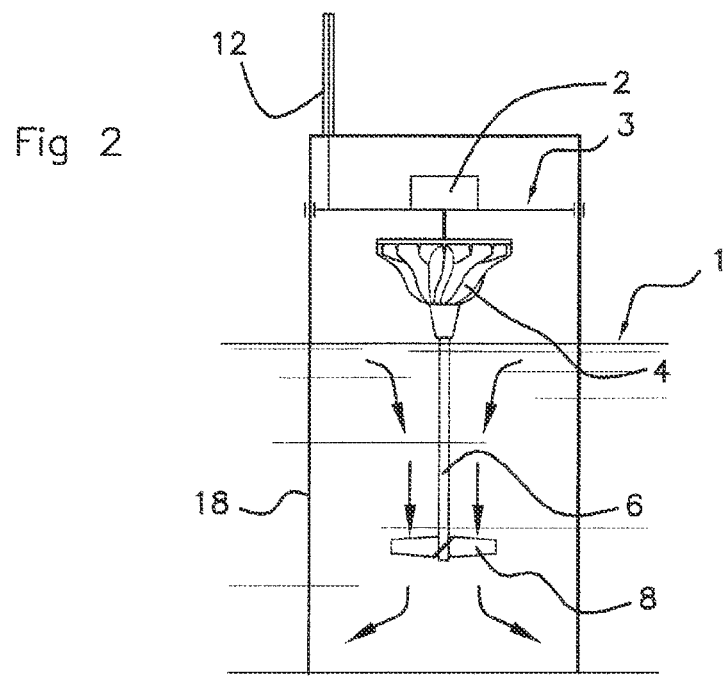
Figure 3:
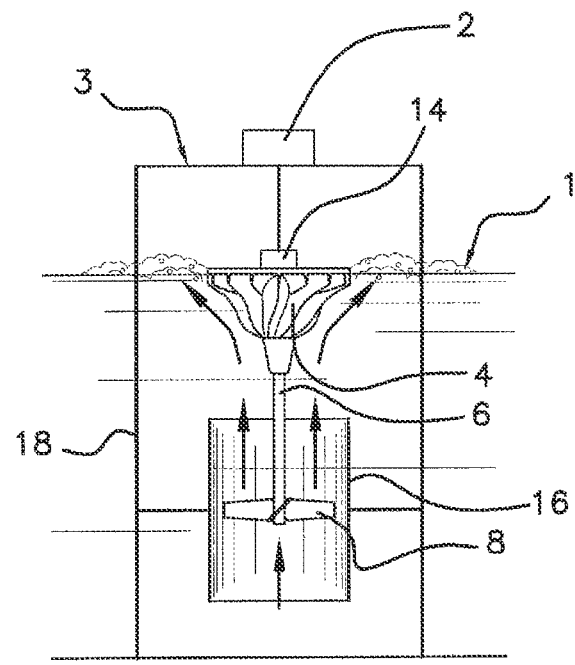
Figure 4:
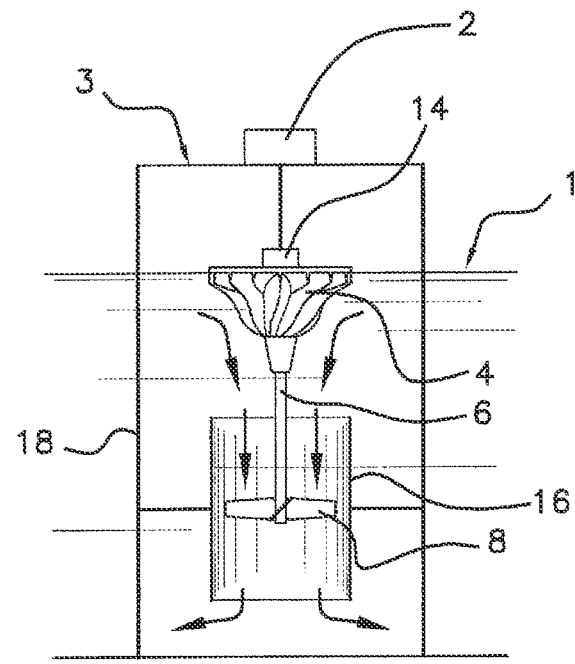
Figure 5A:
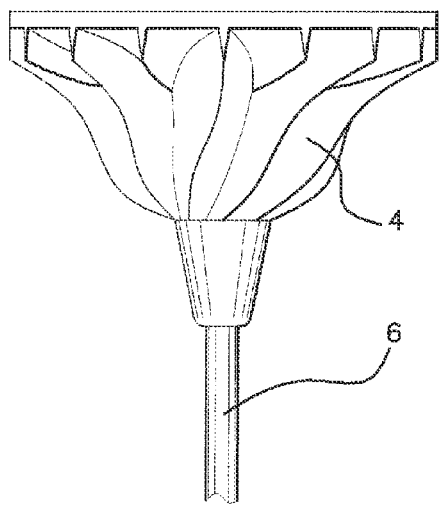
Figure 5B:
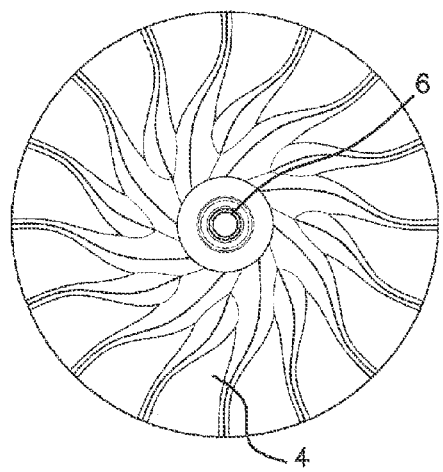
Figure 6A:
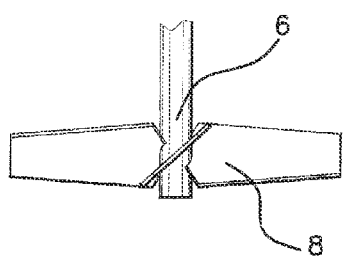
Figure 6B:
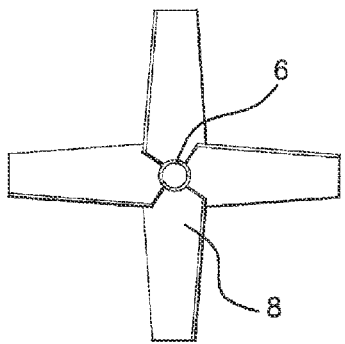

Other objectives, features and advantages of the invention will be appreciated from a reading of the following description of a preferred one of the embodiments thereof, given by way of non-limiting example and with reference to the appended Figures, in which:

FIG. 1 is a schematic illustration of an apparatus according to the invention during an aeration phase, FIG. 2 is a schematic illustration of an apparatus according to the invention during a mixing phase, FIG. 3 is a schematic illustration of an apparatus according to the invention during an aeration phase, FIG. 4 is a schematic illustration of an apparatus according to the invention during a mixing phase, FIG. 5a is a schematic side view of an aerator used in an apparatus according to the invention, FIG. 5b is a schematic illustration of a bottom view of an aerator used in an apparatus according to the invention, FIG. 6a is a schematic side view of a mixer used in an apparatus according to the invention, FIG. 6b is a schematic illustration of a cross-section of a mixer used in an apparatus according to the invention.

An apparatus for mechanically treating a liquid composition contained in a pool according to the invention comprises an electric motor 2 which is supported by a frame so as to be kept out of the liquid composition at all times. The electric motor 2 rotatably drives a drive shaft 6 to which a centrifugal surface aerator 4 and a bottom mixer 8 are coupled. The drive shaft 6 is vertically arranged in the liquid composition in which it is immersed. The drive shaft 6 is arranged so that the bottom mixer 8 is immersed in the liquid composition and directed towards the bottom of the pool and the aerator is located at the level of a surface 1 formed by the liquid composition with the external air. The bottom mixer 8 is under the centrifugal surface aerator 4.

The electric motor 2 is capable of being able to rotatably drive the drive shaft 6 in both possible rotation directions, a first rotation direction of the drive shaft 6 corresponding to a step for aeration and mixing of the liquid composition and a second rotation direction of the drive shaft 6 corresponding to a mixing step without aeration of the liquid composition.

The frame of the apparatus comprises a platform 3 on which the motor 2 rests, and pillars 18 (for example, three pillars) which rest on the base of the pool. The pillars 18 are also optionally fixed to the base of the pool for greater stability. The pillars 18 are formed by cylindrical tubes which are formed by means of revolution and which are arranged vertically in the pool and fixed to the platform 3. The frame of the apparatus may also alternatively comprise a base which rests on the upper edges of the pool, out of the liquid composition.

The distance on the drive shaft between the aerator and the mixer may in particular be selected in accordance with the dimensions of the pool which contain the composition to be treated and the nature of the liquid composition to be treated.

The apparatus is arranged so that the bottom mixer 8 is not in contact with the base of the pool in which it is installed and it may, for example, be arranged so that the distance between the mixer 8 and the base of the pool is between 0.3 m and 6 m.

During an aeration and mixing step (FIGS. 1 and 3), the aerator 4, arranged in the region of the surface of the liquid composition, and the mixer 8 are rotatably driven by the drive shaft 6 in the first rotation direction. The action of the mixer 8 brings about the formation of an ascending flow of the liquid composition, that is to say, starting from the base of the pool, below the mixer 8, and directed towards the surface of the liquid composition, in the region of the aerator 4. In the region of the aerator 4, the flow of liquid composition is projected out of the liquid composition into the external air. Such an aeration phase allows effective aeration of the entire volume of the liquid composition contained in the pool in which an apparatus according to the invention is arranged.

During an aeration and mixing step, the aerator 4 and the mixer 8 are rotatably driven by the drive shaft 6 in the first rotation direction at a rotation speed of the drive shaft which may, for example, be between 10 rpm and 1500 rpm, and more particularly between 30 rpm and 200 rpm.

During a mixing step without aeration (FIGS. 2 and 4), the aerator 4 is deactivated, via a device for activation/deactivation of the aerator, and only the mixer 8 acts on the liquid composition. The mixer is rotatably driven by the drive shaft 6 in the second rotation direction, bringing about the formation of a descending flow of the liquid composition, that is to say, extending from the surface of the liquid towards the mixer 8 and the base of the pool. The rotation of the mixer 8 in the second rotation direction brings about the formation of a vortex at the surface of the liquid composition and allows foams and other deposits which may have formed and accumulated on the surface of the liquid composition to be driven towards the base of the pool during a subsequent optional aeration and mixing step. Such a mixing step without aeration allows anaerobic mixing and homogenisation of the entire volume of the liquid composition contained in the pool in which an apparatus according to the invention is arranged.

During a mixing step without aeration, the mixer 8 is rotatably driven by the drive shaft 6 in the second rotation direction at a rotation speed of the drive shaft which may, for example, be between 10 rpm and 1500 rpm and, more particularly, between 30 rpm and 200 rpm.

In a first embodiment of an apparatus according to the invention corresponding to FIGS. 1 and 2 and in a second embodiment of an apparatus according to the invention corresponding to FIGS. 3 and 4, the device for activation/deactivation of the aerator is constituted by a device 14 for unidirectional rotary transmission, referred to as a free wheel, arranged between the drive shaft and the aerator. According to these two embodiments, in the second rotation direction, the aerator 4 is deactivated and is not rotatably driven by the drive shaft 6.

In the second embodiment of an apparatus according to the invention corresponding to FIGS. 3 and 4, an apparatus according to the invention further comprises a guide conduit 16 formed by a cylindrical portion which is formed by means of revolution and which is hollow and open at the two ends thereof (FIGS. 3 and 4). The guide conduit 16 is arranged parallel with the drive shaft, between the mixer and the aerator. The guide conduit is arranged so that the axis of the drive shaft is aligned with the rotation axis of the cylindrical portion. The guide conduit 16 is fixed to each of the pillars 18 of the apparatus. Such a guide conduit allows the efficiency of an apparatus according to the invention to be improved by channelling the flow of liquid composition formed during an aeration and mixing step and during a step for mixing without aeration. The guide conduit 16 may also be arranged only from the mixer 8 and extend mainly between the mixer and the base of the pool. The distance between the lower end of the guide conduit 16 and the base of the pool may, for example, be between 0.3 m and 3 m, for example, 0.5 m.

FIGS. 5a and 5b are a side view and a bottom view of the aerator 4, respectively. The aerator 4 is generally in the form of a cone, to which there are fixed centrifugal blades which extend in an oblique manner from the tip to the base of the cone. Such an aerator 4 is intended only to be used as an aerator and in only one specific rotation direction in which it has maximum aeration efficiency.

FIGS. 6a and 6b are a side view and a cross-section of the mixer 8, respectively. The mixer 8 is formed by an axial propeller having four blades which have the same movement properties of the liquid composition in both rotation directions of the drive shaft.

The invention may have a very large number of production variants. In particular, an apparatus according to the invention may be fixed to a system of float(s) without requiring a frame which rests on the base of the pool in which it is arranged. Furthermore, in accordance with the dimensions of the pool and the volume of liquid composition to be treated, one or more apparatus(es) according to the invention may be arranged in the same pool.

The invention claimed is:

1. Apparatus for mechanically treating a liquid composition contained in a pool, comprising:
    a frame which supports a motor (2) out of the liquid composition,
    a drive shaft (6) which is rotatably driven by the motor and which is immersed in the liquid composition,
    a centrifugal surface aerator (4) which is rotatably driven by the drive shaft in a first rotation direction of the drive shaft and which is capable of having maximum efficiency for aerating the liquid composition in the first rotation direction of the drive shaft,
    a bottom mixer (8), which is rotatably driven by the drive shaft and immersed in the liquid composition,
    in which:
    the motor (2) is drivable in a second rotation direction, counter to the first rotation direction,
    the apparatus further comprises a motor control unit which controls the driving of the drive shaft (6) in the second rotation direction,
    wherein the apparatus further comprises a device for activation/deactivation of the centrifugal surface aerator (4), said device deactivating the aerator (4) in the second rotation direction of the drive shaft (6) so that the aerator (4) is not rotatably driven by the drive shaft (6), the aerator (4) being inoperative on the liquid composition in the second rotation direction, and
    wherein the centrifugal surface aerator (4) comprises blades that contact the liquid composition when the drive shaft rotates in the second rotation direction.

2. Apparatus according to claim 1, wherein the aerator (4) is generally in the form of a cone to which there are fixed centrifugal ones of said blades which extend in an oblique manner from the tip to the base of the cone.

3. Apparatus according to claim 1, wherein the position of the aerator relative to the level of the liquid composition is identical in the first rotation direction and in the second rotation direction.

4. Apparatus according to claim 1, further comprising a unidirectional rotary transmission device that allows the aerator (4) to be rotatably driven by the drive shaft (6) in the first rotation direction, and disengages the drive shaft (6) and the aerator (4) in the second rotation direction of the drive shaft, for which the aerator is not rotatably driven by the drive shaft.

5. Apparatus according to claim 1, wherein the mixer (8) is formed by an axial propeller.

6. Apparatus according to claim 1, further comprising a guide conduit (16) which is formed by a cylindrical portion formed by means of revolution and which is arranged between the mixer and the aerator so that the axis of the drive shaft is aligned with the rotation axis of the cylindrical portion.

7. Apparatus according to claim 1, wherein the drive shaft is arranged vertically.

8. Apparatus according to claim 1, wherein the rotation axis of the aerator (4) and the rotation axis of the mixer (8) are parallel with the drive shaft.

9. Apparatus according to claim 1, wherein the frame comprises pillars (18) which rest on the base of the pool.

10. Apparatus according to claim 2, wherein the position of the aerator relative to the level of the liquid composition is identical in the first rotation direction and in the second rotation direction.

11. Apparatus according to claim 2, further comprising a unidirectional rotary transmission device that allows the aerator (4) to be rotatably driven by the drive shaft (6) in the first rotation direction, and disengages the drive shaft (6) and the aerator (4) in the second rotation direction of the drive shaft, for which the aerator is not rotatably driven by the drive shaft.

12. Apparatus according to claim 3, further comprising a unidirectional rotary transmission device that allows the aerator (4) to be rotatably driven by the drive shaft (6) in the first rotation direction, and disengages the drive shaft (6) and the aerator (4) in the second rotation direction of the drive shaft, for which the aerator is not rotatably driven by the drive shaft.

13. Apparatus according to claim 2, wherein the mixer (8) is formed by an axial propeller.

14. Apparatus according to claim 3, wherein the mixer (8) is formed by an axial propeller.

15. Apparatus according to claim 4, wherein the mixer (8) is formed by an axial propeller.

16. Apparatus according to claim 2, further comprising a guide conduit (16) which is formed by a cylindrical portion formed by means of revolution and which is arranged between the mixer and the aerator so that the axis of the drive shaft is aligned with the rotation axis of the cylindrical portion.

17. Apparatus according to claim 3, further comprising a guide conduit (16) which is formed by a cylindrical portion formed by means of revolution and which is arranged between the mixer and the aerator so that the axis of the drive shaft is aligned with the rotation axis of the cylindrical portion.

18. Method for mechanically treating a liquid composition contained in a pool, in which:
- a motor (2) is supported out of the liquid composition by a frame,
- a drive shaft (6) is rotatably driven by the motor and is immersed in the liquid composition,
- a centrifugal surface aerator (4) is rotatably driven by the drive shaft in a first rotation direction, the aerator being capable of having maximum efficiency for driving the liquid composition in the first rotation direction of the drive shaft,
- a bottom mixer (8) is rotatably driven by the drive shaft,
- the driving of the drive shaft (6) in a second rotation direction, counter to the first rotation direction, is controlled via a control unit of the motor,
- wherein, in the second rotation direction, the aerator (4) is deactivated by an activation/deactivation device of the aerator (4) so that the aerator is not rotatably driven by the drive shaft (6), in order to render the aerator inoperative on the liquid composition in the second rotation direction, and
- wherein the centrifugal surface aerator has blades that contact the liquid composition when the drive shaft rotates in the second rotation direction.

19. Method according to claim 18, wherein, in the first rotation direction, the aerator (4) and the mixer (8) are rotatably driven by the shaft (6) and allow the formation of an ascending flow of liquid composition from the mixer (8) towards the aerator (4).

20. Method according to claim 18, wherein, in the second rotation direction, the aerator (4) is rendered inoperative and the mixer (8) is rotatably driven by the drive shaft, the mixer allowing the formation of a descending flow of liquid composition from the surface of the liquid towards the mixer (8).

* * * * *